United States Patent [19]

Montagu

[11] Patent Number: 4,694,212
[45] Date of Patent: Sep. 15, 1987

[54] MAGNETIC PRELOADING OF ACTUATOR BEARINGS

[75] Inventor: Jean I. Montagu, Brookline, Mass.

[73] Assignee: General Scanning, Inc., Watertown, Mass.

[21] Appl. No.: 842,623

[22] Filed: Mar. 21, 1986

[51] Int. Cl.$^4$ ............................................. H02K 7/08
[52] U.S. Cl. ...................................... 310/90; 310/90.5
[58] Field of Search .................. 310/36, 90, 156, 261, 310/90.5; 335/272; 350/6.91; 384/447, 495, 513, 516, 612

[56] References Cited

U.S. PATENT DOCUMENTS

| | | | |
|---|---|---|---|
| 3,112,464 | 11/1963 | Ratajski et al. | 310/156 |
| 3,447,239 | 6/1969 | Slick | 29/596 |
| 3,624,574 | 11/1971 | Montagu | 335/230 |
| 4,135,119 | 1/1979 | Brosens | 318/128 |
| 4,164,722 | 8/1979 | Garvey | 335/272 |
| 4,347,452 | 8/1982 | Imahashi | 310/76 |
| 4,480,881 | 11/1984 | Fujimori | 310/90 |

Primary Examiner—Patrick R. Salce
Assistant Examiner—D. L. Rebsch

[57] ABSTRACT

Radial free play is reduced in rotor bearings of a limited rotation electromechanical actuator of the kind having a stator assembly with a plurality of stator pole faces, a rotor with a plurality of rotor pole faces, two bearings supporting opposite ends of the rotor and means for establishing magnetic flux across the gaps. In various aspects, the stator and rotor pole faces are cylindrical and the central axis of the rotor pole faces is tilted relative to the central axis of the stator pole faces; a region of a gap between the stator and rotor pole faces produces both the radial free-play-reducing forces and at least part of the driving torque; the gap rotor varies in size along its length but nowhere is so great as to have an effectively infinite reluctance; the gap varies continuously along its length; and each bearing has radial free play equal to at least 10% of twice the difference in the diameters of the stator and rotor pole faces.

13 Claims, 7 Drawing Figures

MAGNETIC PRELOADING OF ACTUATOR BEARINGS

BACKGROUND OF THE INVENTION

This invention relates to radially loading the rotor bearings of a limited rotation electomechanical actuator.

Even relatively expensive ball bearings used to hold the ends of the rotor shaft of such an actuator inherently have radial free play. If not adequately controlled, this radial free play can allow the rotor to shift radially causing bearing fretting corrosion and in some instances can make the rotor motion to noisy, typically leading to a catastrophic failure. Various techniques have been attempted to control the free play. Axial preload is normally used with rotating machinery but the resulting added friction makes this method unacceptable to precision oscillating scanners.

In Montagu, U.S. Pat. No. 3,624,574, the bearings are mechanically loaded radially by a flexed torsion bar connected coaxially to one end of the rotor shaft. The rotational stiffness of the torsion bar limits its utility in high-speed applications.

In Brosens, U.S. Pat. No. 4,135,119, incorporated herein by reference, the bearings are proposed to be loaded radially by an imbalanced bias magnetic flux that results from slotting one or both pole faces of the rotor.

SUMMARY OF THE INVENTION

The invention reduces the radial free play in rotor bearings of a limited rotation electromechanical actuator of the kind having a stator assembly with a plurality of stator pole faces, a rotor with a plurality of rotor pole faces, two bearings supporting opposite ends of the rotor, and means for establishing magnetic flux across the gaps.

One general feature of the invention is that the stator and rotor pole faces are cylindrical and the central axis of the rotor pole faces is subjected to a predetermined tilt relative to the central axis of the stator pole faces.

Another general feature is that a magnetic drive flux is established across the gaps between the stator and rotor pole faces to cause a rotational driving torque, a magnetic bias flux is also established across the gaps, and at least one gap has a configuration such that the flux action across it produces radial forces that act upon the rotor to reduce the radial free play; the gap has at least a region where the radial forces are produced, and that region is also configured so that drive flux also operates in that region to cause driving torque.

Another general feature is that the gap varies in size along the length of the motor but nowhere is so great as to have effectively infinite reluctance.

Another general feature is that the gap varies continously along the entire length of the rotor.

Another general feature is that the rotor has rotor shaft segments coaxial with the axis of the rotor pole faces, each bearing has a fixed element attached to the stator assembly and a floating element attached to the rotor, and the amount of total radial free play in each bearing or between bearing and shaft seat is at least 20% of the difference in the diameters of the stator and rotor pole faces whereby the rotor is permitted to tilt relative to the stator assembly to cause the gaps to vary along the length of the rotor.

Preferred embodiments of the invention include the following features. Sets of the rotor and stator pole faces are arranged around the axis of rotation, and the sets of pole faces produce respective radial forces which cooperate to generate a torque on the rotor. The gap size increases linearly with distance along the axis. The radial forces tend to reduce the radial free play in both bearings. The radial forces are applied in opposite radial directions respectively to the two bearings. There are two rotor pole faces and four stator pole faces and each rotor pole face spans two of the stator pole faces. The rotor has a pair or cylindrical pole faces and a mounting shaft whose axis is not coaxial with the axis of the stator pole face cylinder. The magnetic bias flux is established by a permanent magnet extending along the axis of the actuator and whose opposite poles are respectively permeably connected to different stator pole faces.

Radial free play in the bearings is reduced simply, continually, and automatically at any position within the actuator's excursion range without using rotationally stiff torsion bars. The radial loading is achieved even when very close assembly and concentricity tolerances have not been met. Bearings having large free play or loose fit can be used to automatically provide tilt. Radial free play is reduced without reducing the rotational drive torque for a given length of rotor.

The radial force obtainable on each bearing can be controlled, for example, to be as high as 3000 grams or as low as 0 grams for a unit which has a bore of $\frac{1}{2}''$, an axial length of $1\frac{1}{2}''$, a total angular rotation of approximately 30° and a peak torque at null position of 2000 gm-cm.

Other advantages and features will become apparent from the following description of the preferred embodiment, and from the claims.

DESCRIPTION OF THE PREFERRED EMBODIMENT

We first briefly describe the drawings.

Drawings

STRUCTURE AND OPERATION

Figure 1:
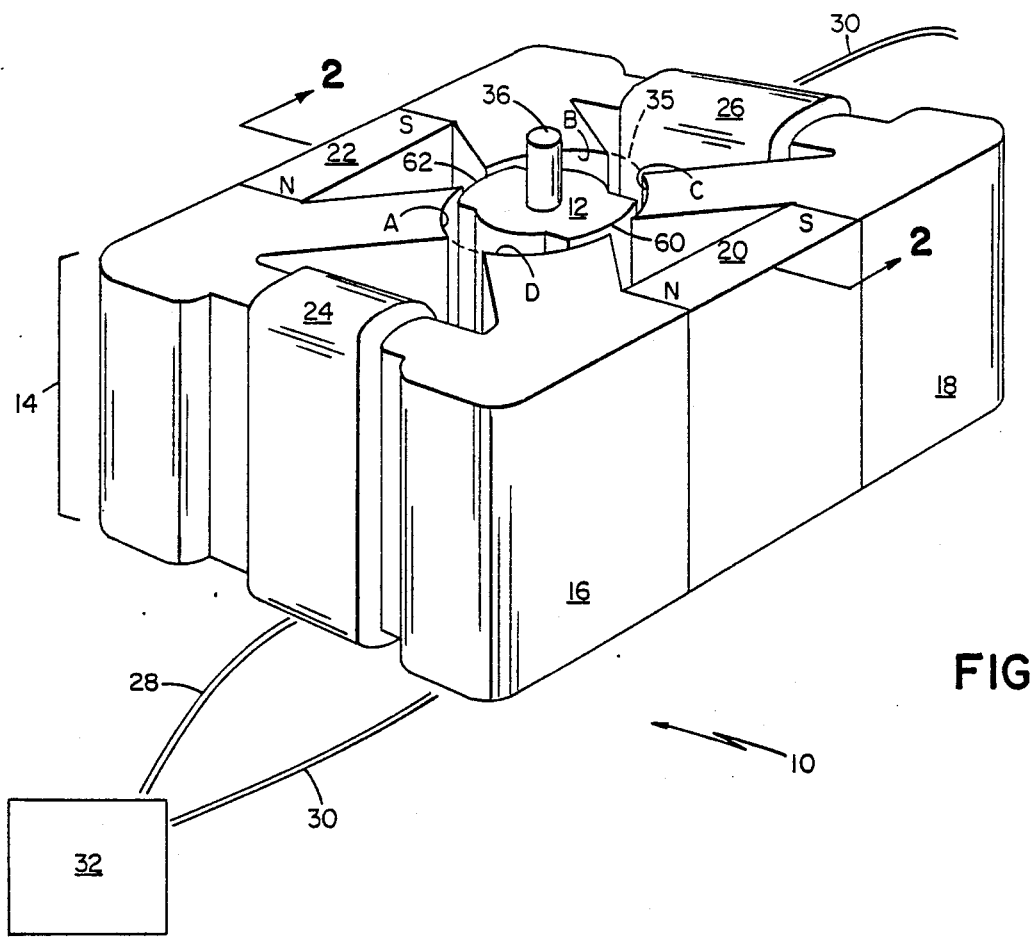
FIG. 1 is an isometric view of a rotor and stator assembly of a limited rotation actuator.

Referring to FIG. 1, a limited rotation actuator 10 includes a ferromagnetic rotor 12 which rotates within a cylindrical space defined by a stator assembly 14. Assembly 14 has two stacks 16, 18 of ferromagnetic laminations joined by a pair of permanent magnets 20, 22. Stacks 16, 18 define four stator pole faces A, B, C, D which all lie on an imaginary cylindrical surface 35. Magnets 20, 22 provide bias flux. A pair of drive coils 24, 26 are wound respectively on stacks 16, 18 to provide drive flux that interracts with the bias flux to produce driving torques to cause rotation of rotor 12 through a limited angle of excursion. Cables 28, 30 connect coils 24, 26 to a control amplifier 32 which provides drive currents to cables 28, 30 based on position feedback signals received over a cable 34 from a position sensor (not shown). The currents generated by amplifier 32 can, for example, be controlled to cause rotation of the angular orientation of rotor 12 through a limited excursion in either direction for driving or pointing an optical scanning element (not shown) attached to an end of shaft 36 of rotor 12.

Figure 2:
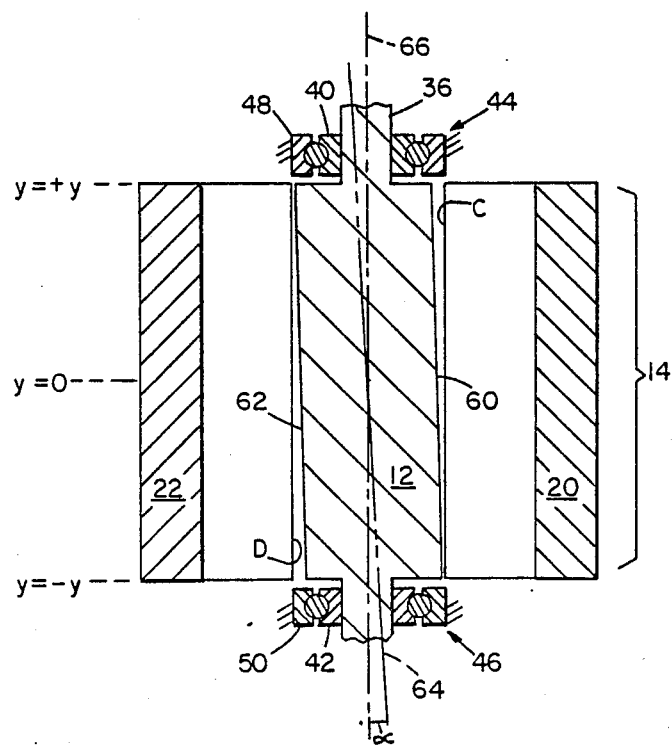
FIG. 2 is a side sectional view of the actuator of FIG. 1 at 2—2 also showing rotor shaft bearings.
Figure 3:
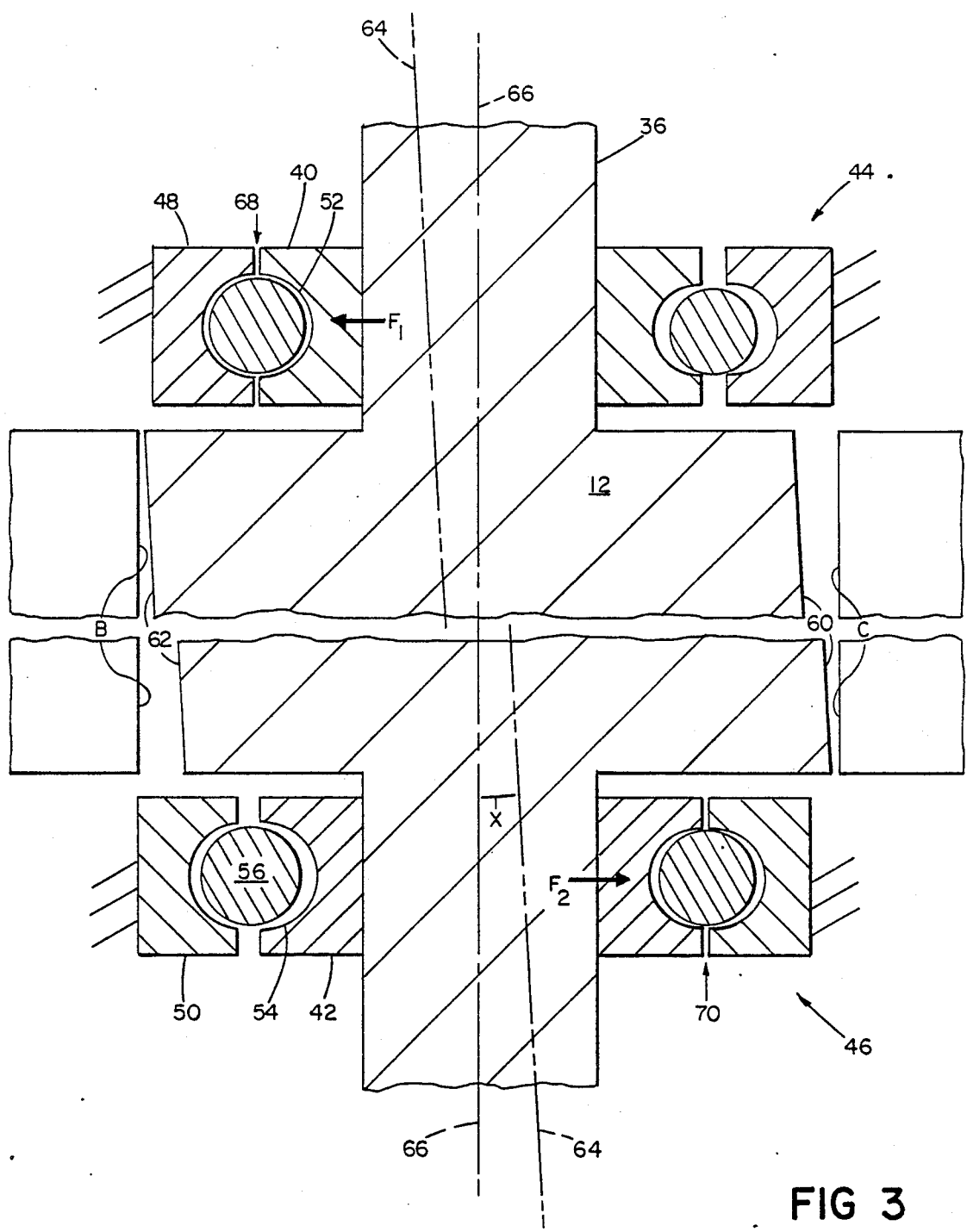
FIG. 3 is an enlarged side sectional view, broken apart and partially cut away, of the actuator of FIG. 1.

Referring to FIGS. 2, 3, rotor shaft 36 is fixed at its opposite ends to the inner sleeve 40, 42 of instrument grade ball bearings 44, 46. Outer sleeves 48, 50 of bearings 44, 46 are both held fixed relative to stator assembly 14. Steel balls 56 are carried in 52, 54 in the raceways formed between grooves in inner sleeves 40, 42, and outer sleeves 48, 50. Bearings 44, 46 have a degree of radial free play between sleeves 40 and 48 and between sleeves 42, 50. The two pole faces 60, 62 of rotor 12 lie on an imaginary cylindrical surface. The central axis 64 of the cylindrical surface on which rotor pole faces 60, 62 lie is tilted by an angle $\alpha$ from the central axis 66 of the stator bore represented by imaginary cylindrical surface 35 on which stator pole faces A, B, C, D lie. The central axis 66 of surface 35 is approximately coaxial with shaft 36. The cylindrical surface on which the rotor pole faces lie is smaller in diameter than the cylindrical surface on which the stator pole faces lie. As a result of this configuration, at one end of rotor 12 (e.g., the top end in FIG. 3), the gap between faces A or B and 62 is smaller than between faces C or D and 60, and vice versa at the other end of rotor 12. As explained below, the magnetic flux operates across those gaps to radially load the two bearings 44, 46 in opposite directions, thus minimizing radial free play and hence radial movement of rotor 12. At the top of rotor 12 in FIG. 3, a force $F_1$ minimizes the free play 68 between the left side of fixed outer sleeve 48 and the left side of floating inner sleeve 40. Simultaneously, a force $F_2$ at the bottom of rotor 12 minimizes the free play 70 between the right sides of sleeves 50, 42.

Figure 4:
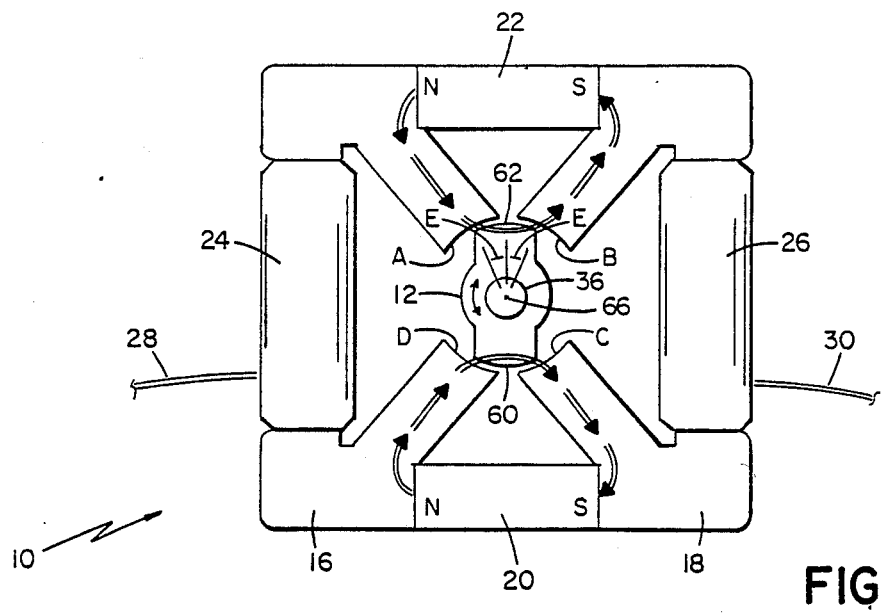
FIG. 4 is a top view of the actuator of FIG. 1.

Referring to FIG. 4, rotor pole faces 60, 62 respectively span stator pole faces C, D and A, B in the neutral position shown and also in each other angular position within some maximum excursion of $\pm E$ from the neutral position. The bias flux established by magnet 20 has a path that crosses the gap from face C to face 60 and then the gap from face 60 to face D. Similarly, the path of the bias flux established by magnet 22 crosses the gap from face A to face 62 and then the gap from face 62 to face B.

Figure 5:
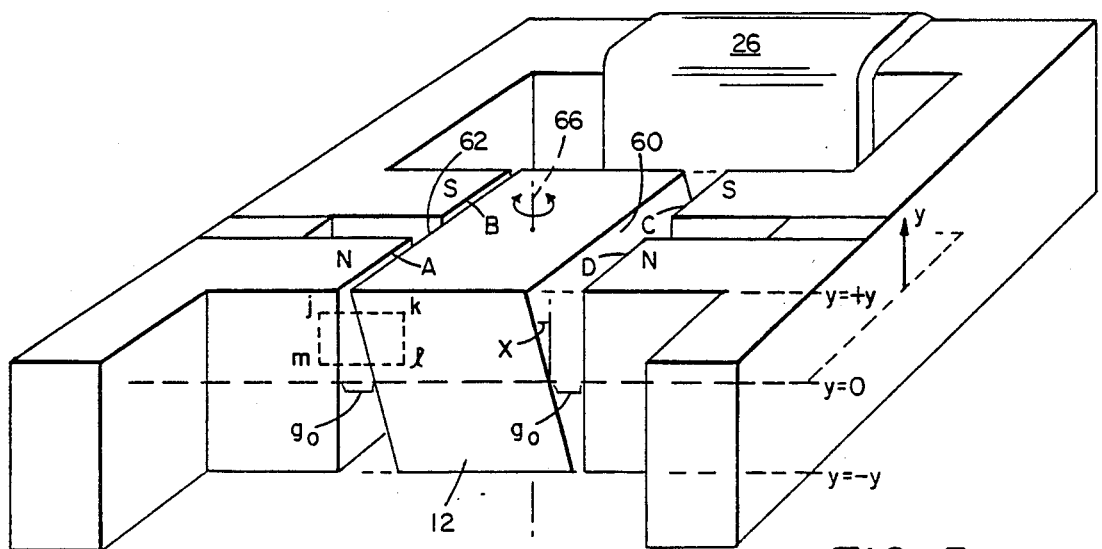
FIG. 5 is a symbolic representation of the pole faces and gaps of the actuator of FIG. 1.

Referring to FIG. 5, the pole faces and gaps of the actuator can be represented symbolically (for purposes of calculating the torques that produce the forces $F_1$, $F_2$ in FIG. 3), by eliminating the curvature of the pole faces. Three parallel imaginary planes (all normal to axis 66) are shown at different positions along the 67 axis. The $y=0$ plane lies midway between the planes ($y=+Y$ and $y=-Y$) at the top and bottom of rotor 12. All of the pole face gaps at the $y=0$ plane are the same ($g_0$).

The radial loading torque exerted on the rotor as a result of the permanent magnet bias flux in general is $$T = \frac{dU}{d\alpha}$$

where U is the total stored in the four gaps A-62, B-62, C-60, D-60, which we will call $gap_A$, $gap_B$, $gap_C$, and $gap_D$, and $\alpha$ is the inter-axis angle (FIG. 3) (The magnetic field of the permanent magnet is several times larger than the magnetic field induced by the control current, and therefore only the effects of the permanent magnet are considered in this analysis).

Thus $$U = U_A + U_B + U_C + U_D \quad (1)$$

The magnetic energy in $gap_A$, $U_A$, is the volume integral $$U_A = \mu/2 \int H_A^2 dv \quad (2)$$

where $H_A$ is the magnetic field in $gap_A$ supported by magnet 22, $\mu$ is the permeability of the air in the gap, and dv is an incremental volume.

$H_A$ can be determined using Ampere's law where no currents are present. The line integral along a flux path, e.g., a path N-A-62-B-S-N in a plane having a given y position $$\oint H \cdot dl = 0 \quad (3)$$

where dl is an incremental length.

Assuming that the iron rotor and stator poles all have infinite permeability, the line integral simplifies to $$H_A(y) \cdot g_A + H_B(y) \cdot g_B + H_M \cdot L_M = 0 \quad (4)$$

where magnet field $H_M$ and magnet dimension $L_M$ are constant, and $g_A$ and $g_B$ are the widths of gaps A and B respectively at the given y position.

Because the gap and pole structure is symmetrical above and below the $y=0$ plane, it is convenient to use that plane as a reference plane so that $$g_A(0) = g_B(0) = g_0, \quad (5)$$

where $g_A(0)$ means the width of $gap_A$ at the $y=0$ plane.

Because gaps $g_A(0)$ and $g_B(0)$ are identical and connected in parallel through identical pole faces that are themselves magnetically connected $$H_A(y) = H_B(y) \quad (6)$$

and thus (from the integral 4 set forth above)

$$H_A(0)g_0 + H_B(0)g_0 + H_M \cdot L_M = 0.$$

Therefore, $$H_A(0)g_0 = H_B(0)g_0 = -\tfrac{1}{2}H_M \cdot L_m = H(0)g_0. \quad (7)$$

The $gap_A$ as a function of y is $$g_A(y) = g_0 - \alpha y \quad (8)$$

Applying Ampere's law to the path jklm gives the magnetic field under pole A as a function of y as $$H_A(y) = H(0) \frac{1}{1 - \alpha y/g_0} \quad (9)$$

Similarly, $$H_B(y) = H_B(0) \frac{1}{1 - \alpha y/g_0} \quad (10)$$

Using these expressions for the magnetic field, the magnetic energy under each pole (A, B, C, D) can be calculated using equation 2 as follows $$U_A = \frac{\mu}{\lambda} \int H_A^2 dv = \frac{\mu}{2} \int H^2(0) \frac{1}{(1 - \alpha y/g_0)^2} \cdot dv \quad (11)$$

The incremental volume dv is a function of y:

$$dv = w(g_0 - \alpha y)dy = \frac{wg_0^2}{\alpha} (1 - \alpha y/g_0)d(\alpha y/g_0) \quad (12)$$

where w is the width along the gap in a direction normal to the directions in which y and $g_0$ are measured.

Thus equation 11 for $U_A$ simplifies to $$U_A = \frac{\mu w H^2(0)g_0^2}{2\alpha} \int_{-Y}^{+Y} \frac{d(\alpha y/g_0)}{1 - \alpha y/g_0} \quad (13)$$

which expands to $$U_A = \quad (14)$$

$$-\frac{\mu w}{2\alpha} [H_A^2(y = 0)g_0^2] \left\{ \ln\left(1 - \frac{\alpha Y}{g_0}\right) - \ln\left(1 - \frac{\alpha Y}{g_0}\right) \right\}$$

Keeping in mind that $U_A = U_B$, we must now determine $U_C$. $U_D$ will be equal to $U_C$. For determining $U_C$, the gap $$g_C(y) = g_0 + \alpha y \quad (15)$$

and the incremental volume is $$dv = w(g_0 + \alpha y)dy = wg_0^2/\alpha \cdot (1 + \alpha y/g_0) \cdot d(\alpha y/g_0) \quad (16)$$

Then $$U_c = \frac{\mu}{2} \int H_c^2(y)dv = \frac{\mu w[H(0)g_0]^2}{2\alpha} \int_{-Y}^{+Y} \frac{d(\alpha y/g_0)}{1 + \alpha y/g_0} \quad (17)$$

which expands to $$U_C = \frac{\mu w[H(0) \cdot g_0]^2}{2\alpha} \{\ln(1 + \alpha Y/g_0) - \ln(1 - \alpha Y/g_0)\} \quad (18)$$

which is equal to $U_A$. Thus $U_A = U_B = U_C = U_D$ and the total magnetic energy $$U = \frac{2\mu w}{\alpha} [H(0)g_0]^2 \left\{ \ln \frac{1 + \alpha Y/g_0}{1 - \alpha Y/g_0} \right\} \quad (19)$$

This can be simplified by expressing the ratio x of the pole tilt $\alpha$ to the maximum possible pole tilt ($g_0/y$).

$$x = \alpha/g_0/Y = \alpha Y/g_0 \quad (20)$$

Then $$U = 2\mu w H^2(0) \cdot \frac{g_0 Y}{x} \cdot \ln \frac{1 + x}{1 - x} \quad (21)$$

Because energy is not a polarized quantity and because all of the gaps have identical shape and volume when rotor 12 is at its neutral position, it is apparent that the energy under the pole faces A, B, C, D are all equal.

Similarly, the last derived expression for U remains valid when the rotor is at angular positions other than the neutral position, so long as each rotor pole continues to span both of its associated stator poles.

From the expression for torque $T = dU/d\alpha$, where $d\alpha = [g_0/Y]dx$, it can be seen that $$T = \frac{Y}{g_0} \frac{dU}{d\alpha} = 2\mu w[H(0) \cdot Y]^2 \frac{d}{dx} \left( \frac{1}{x} \cdot \ln \frac{1 + x}{1 - x} \right) \quad (22)$$

$$= 2\mu w[H(0) \cdot Y]^2 \left\{ \frac{2}{x} \cdot \frac{1}{1 - x^2} - \frac{1}{x^2} \ln \frac{1 + x}{1 - x} \right\} \quad (23)$$

The Taylor series expansion of the logarithmic term gives $$T = 2\mu w[H(0) \cdot Y]^2 \left( \frac{2}{x} \cdot \frac{1}{1 - x^2} - \right. \quad (24)$$

$$\left. \frac{2}{x^2} \left( x + \frac{x^3}{3} + \frac{x^5}{5} + \frac{x^7}{7} + \ldots \right) \right)$$

which can be rearranged as $$T = 2\mu w[H(0) \cdot Y]^2 \left\{ \frac{2}{x} \left( \frac{1}{1 - x^2} - \right. \right. \quad (25)$$

$$\left. \left. 1 - \frac{x^2}{3} \right) - 2\left( \frac{x^3}{5} + \frac{x^5}{7} + \ldots \right) \right\}$$

which simplifies as $$T = \quad (26)$$

$$-2\mu w[H(0) \cdot Y]^2 \left\{ \frac{2x}{3} \cdot \frac{2 + x^2}{1 - x^2} + 2\left( \frac{x^3}{5} + \frac{x^5}{7} + \ldots \right) \right\}$$

This expression is consistent with expectations. For example, when $x = \alpha = 0$ (i.e., axis 66 is coaxial with axis 64) torque is null, and when $x = 1$ (i.e., $\alpha = g_0$, meaning that the rotor ends touch the stator pole faces) the torque reaches infinity (assuming no saturation takes place).

Where $x < \frac{1}{2}$ the series in brackets in equation 26 can be represented by its first term alone with a resulting error of onyl $\frac{1}{2}\%$. Thus torque can be represented in typical cases as $$T = -4 \mu w[H(0) \cdot Y]^2 \cdot \left( x \left( \frac{2 + x^2}{1 - x^2} \right) + \frac{3}{5} x^3 \right) \quad (27)$$

The following table shows values of the term $$x\left(\frac{2+x^2}{1-x^2}\cdots\right)$$

for various tilt ratios x.

| x | $x\left(\frac{2+x^2}{1-x^2}\right) + \frac{3}{5}x^3 + \frac{3}{7}x^5$ |
| --- | --- |
| 0.0 | 0 |
| 0.05 | 0.10041 |
| 0.1 | 0.2036 |
| 0.2 | 0.4299 |
| 0.3 | 0.7062 |
| 0.4 | 1.0714 |
| 0.5 | 1.5884 |
| 0.6 | 2.3749 |

The torque increases rapidly with x and can be chosen to produce an appropriate pair of forces $F_1$, $F_2$ (FIG. 3), thus radially loading the rotor as desired.

In one specific example, the actuator 10 has the following specifications:

| | |
| --- | --- |
| total height in y direction | 1.45" |
| diameter of stator pole face cylinder | 0.4500" |
| diameter of rotor pole face cylinder | 0.492" |
| tilt angle (α) | 0.0010 radians |
| x | 0.35 |
| bearing radial free play | 0.0004" |
| magnet field strength | 1 Tesla |
| resulting force on top bearing of rotor | 1952 grams |

Other embodiments are within the following claims.

Figure 6:
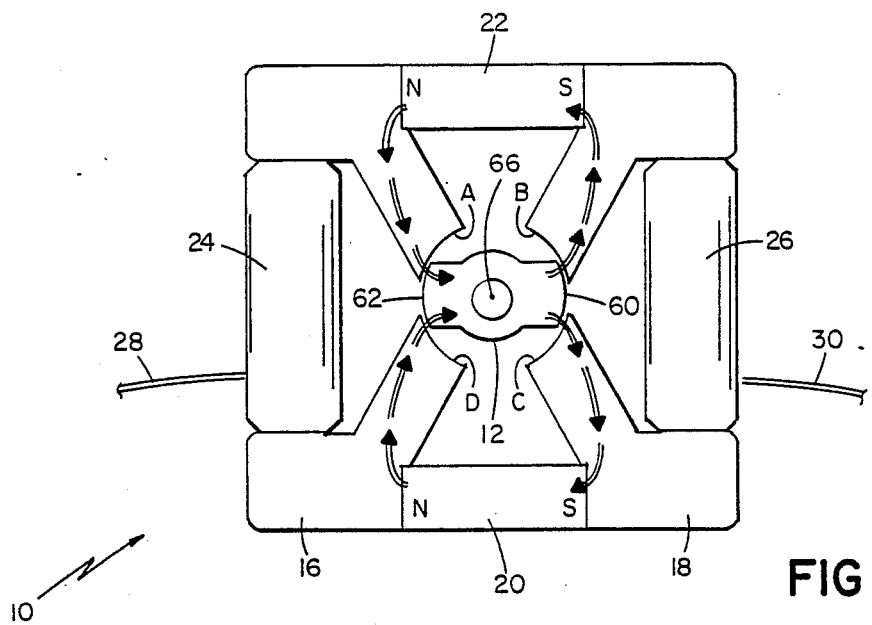
FIG. 6 is a top view of another actuator embodiment.

For example, referring to FIG. 6, the rotor pole faces can each straddle two stator pole faces of the same polarity. Such a configuration can be analyzed in a similar manner to show that $H_A(y)=H_A'(y)=H_B'(-y)=H_C'(-y)=H_D'(y)$ and that $U_A=U_A'=U_B'=U_C'=U_D'$, where prime values are those pertaining to FIG. 6.

Instead of tilting shaft 36 relative to rotor pole faces 60, 62, as in FIG. 2, shaft 36 can be coaxial with the axis of rotor pole faces 60, 62 and tilted relative to axis 66, by offsetting the bearings relative to axis 66.

Figure 7:
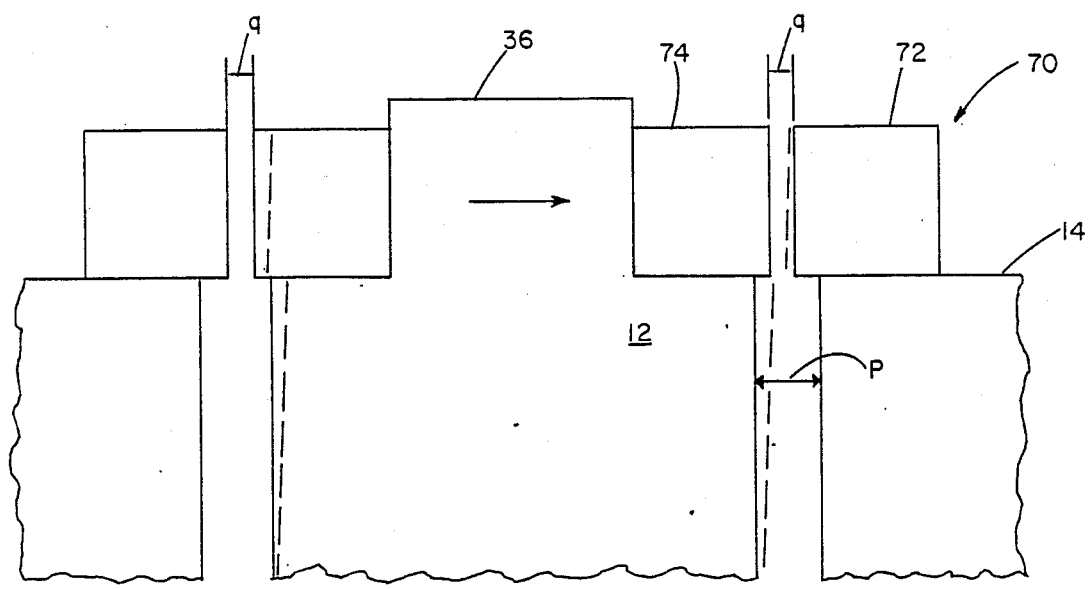
FIG. 7 is a schematic side view of another actuator embodiment.

Alternatively, referring to FIG. 7, bearings 70 with relatively large free play can be used. One element 72 of each bearing is fixed to the stator assembly 14 while the other floating element 74 is fixed to the rotor 12. If the difference in diameters of the rotor and stator is P, then the free play in each direction (q) can be as much as 20% of P. For example, if P is 0.002 inches, then the radial free play in one direction can be 0.0004, for a total radial free play in both directions of 0.0008 inches. In that case, the magnetic flux will cause the rotor to maintain a tilted position relative to the stator assembly (as indicated by dashed lines), keeping the bearings preloaded as desired.

I claim:

1. A limited rotation electromechanical actuator comprising
   a stator assembly having a plurality of cylindrical stator pole faces,
   a rotor mounted for rotation about an axis and within the cylindrical space defined by said stator pole faces, said rotor having a plurality of cyindrical rotor pole faces juxtaposed opposite and spaced from said stator pole faces by gaps,
   a pair of bearings respectively supporting opposite ends of said rotor, said bearings being characterized by radial free play, and
   means for establishing magnetic flux across said gaps,
   the central axis of said cylindrical rotor pole faces being subjected to a predetermined tilt relative to the central axis of said stator pole faces,
   whereby said magnetic bias flux acting across said gaps causes a torque on said rotor about an axis at an angle to said axis of rotation that radially loads said bearings respectively in opposite radial directions, minimizing said free play.

2. A limited rotation electromechanical actuator comprising
   a stator assembly having a plurality of stator pole faces,
   a rotor having a plurality of rotor pole faces,
   two bearings for supporting said rotor for rotation about an axis relative to said stator assembly such that said rotor pole faces are juxtaposed opposite and spaced from said corresponding stator pole faces by gaps, said bearings being characterized by radial free play,
   means for establishing magnetic drive flux across said gaps to cause a rotational driving torque to act upon said rotor, and
   means for establishing magnetic bias flux across said gaps, at least one said gap having a configuration such that said flux acting across said gap produces radial forces that act upon said rotor to reduce said radial free play in said bearings,
   said gap having at least a region where said fluxes act to produce said radial forces, said region being configured such that said drive flux also operates in said region to produce said driving torque.

3. A limited rotation electromechanical actuator comprising
   a stator assembly having a plurality of stator pole faces,
   a rotor having a plurality of rotor pole faces,
   two bearings for supporting said rotor for rotation about an axis relative to said stator assembly such that said rotor pole faces are juxtaposed opposite and spaced from said corresponding stator pole faces by gaps which extend along the length of said rotor, said bearings being characterized by radial free play,
   means for establishing magnetic drive flux across said gaps to cause a rotational driving torque to act upon said rotor, and
   means for establishing magnetic bias flux across said gaps, at least one said gap having a configuration such that said flux acting across said gap produces radial forces that act upon said rotor to reduce said radial free play in said bearings,
   said gap having a varying size along its length but nowhere so great as to have effectively infinite reluctance.

4. A limited rotation electromechanical actuator comprising
   a stator assembly having a plurality of stator pole faces,
   a rotor having a plurality of rotor pole faces,
   two bearings for supporting said rotor for rotation about an axis relative to said stator assembly such that said rotor pole faces are juxtaposed opposite and spaced from said corresponding stator pole faces by gaps, said bearings being characterized by radial free play, means for establishing magnetic drive flux across said gaps to cause a rotational driving torque to act upon said rotor, and means for establishing magnetic bias flux across said gaps, at least one said gap having a configuration such that said flux acting across said gap produces radial forces that act upon said rotor to reduce said radial free play in said bearings, said gap varying continuously in size along the entire length of said rotor.

5. A limited rotation electromechanical actuator comprising a stator assembly having a plurality of cylindrical stator pole faces, a rotor having a plurality of rotor pole faces and two rotor shaft segments respectively on opposite ends of said rotor, the axes of said shaft segments being coaxial with the axis of said rotor pole faces, and two bearings respectively supporting said rotor for rotation about an axis relative to said stator assembly such that said rotor pole faces are juxtaposed opposite and spaced from said corresponding stator pole faces by gaps, said bearings each comprising a fixed element and a floating element, said fixed element being attached to said stator assembly, said floating element being attached to one of said rotor shaft segments, said bearings each being characterized by radial free play, the amount of said radial free play in each said bearing being at least 10% of twice the difference in the diameters of said stator and rotor pole faces whereby said rotor is permitted to tilt relative to said stator assembly to cause said gaps to vary along the length of said rotor, and means for establishing magnetic flux across said gaps to cause said rotor to be held in a tilted position relative to said stator assembly with said radial free play being reduced.

6. The actuator of claim 1, 2, 3, 4, or 5 comprising sets of said rotor and stator pole faces arranged around said axis and wherein said sets of pole faces produce respective radial forces which cooperate to generate a torque on said rotor.

7. The actuator of claim 2, 3, 4, or 5 wherein said gap size increases linearly with distance along said axis.

8. The actuator of claim 2, 3, 4, or 5 wherein said pole faces comprise cylindrical surfaces and the central axis of said cylindrical surfaces of said rotor pole faces is not coaxial or parallel with the central axis of said cylindrical surfaces of said stator pole faces.

9. The actuator of claim 1, 2, 3, 4, or 5 wherein said radial forces tend to reduce said radial free play in both said bearings.

10. The actuator of claim 1, 2, 3, 4, or 5 wherein said radial forces are applied in opposite radial directions respectively to said two bearings.

11. The actuator of claim 1, 2, 3, 4, or 5 wherein there are two said rotor pole faces and four said stator pole faces and each said rotor pole face spans two of said stator pole faces.

12. The actuator of claim 1, 2, 3, 4, or 5 wherein said rotor comprises a pair of cylindrical pole faces and a mounting shaft whose axis is set at an acute angle to the axis of the rotor pole face cylinder.

13. The actuator of claim 1, 2, 3, 4, or 5 wherein said means for establishing magnetic bias flux comprises a permanent magnet means extending along said axis and whose opposite poles are respectively permeably connected to different ones of said stator pole faces.

* * * * *

UNITED STATES PATENT AND TRADEMARK OFFICE
CERTIFICATE OF CORRECTION

PATENT NO. : 4,694,212
DATED : September 15, 1987
INVENTOR(S) : Montagu

It is certified that error appears in the above-identified patent and that said Letters Patent are hereby corrected as shown below:

Col. 1, line 5, "electromechanical" is misspelled;

Col. 1, line 14, "to noisy" should be --too noisy--;

Col. 1, line 53, "motor" should be --rotor--.

Signed and Sealed this

Fifteenth Day of March, 1988

Attest:

DONALD J. QUIGG

*Attesting Officer*

*Commissioner of Patents and Trademarks*